United States Patent

Cook et al.

Patent Number: 6,084,627
Date of Patent: Jul. 4, 2000

[54] APPARATUS FOR AND METHOD OF CONTROLLING AN IMAGE RECORDING DEVICE

[75] Inventors: Paul Christopher Cook, Cheltenham; Raymond John Drewett, Emsworth; Alan Peter Ogburn, Berkeley, all of United Kingdom

[73] Assignee: ICG Limited, Cheltenham, United Kingdom

[21] Appl. No.: 08/838,707

[22] Filed: Apr. 9, 1997

[30] Foreign Application Priority Data

Apr. 9, 1996 [GB] United Kingdom .................. 9607306

[51] Int. Cl.[7] ...................................... G02F 1/33
[52] U.S. Cl. ...................... 347/248; 347/234; 347/239; 347/255; 359/285; 359/312; 385/7
[58] Field of Search .................................. 347/235, 236, 347/246, 248, 249, 250, 255, 234, 239; 250/236; 359/312, 285, 287, 305; 385/7

[56] References Cited

U.S. PATENT DOCUMENTS

| | | | |
|---|---|---|---|
| 4,251,825 | 2/1981 | Mikami et al. | 347/250 |
| 4,342,050 | 7/1982 | Traino | 358/406 |
| 4,635,000 | 1/1987 | Swanberg | 331/10 |
| 4,803,367 | 2/1989 | Murase | 250/236 |
| 4,912,487 | 3/1990 | Porter et al. | 347/255 |
| 4,950,889 | 8/1990 | Budd et al. | 250/236 |
| 5,347,298 | 9/1994 | Gokita | 347/133 |
| 5,369,423 | 11/1994 | Hunter et al. | 347/255 |
| 5,541,637 | 7/1996 | Ohashi et al. | 347/248 |
| 5,633,747 | 5/1997 | Nikoonahad | 359/312 |

FOREIGN PATENT DOCUMENTS

| | | |
|---|---|---|
| 0 691 783 A2 | 4/1993 | European Pat. Off. . |
| 0 535 783 A1 | 1/1996 | European Pat. Off. . |

*Primary Examiner*—N. Le
*Assistant Examiner*—Hai C. Pham
*Attorney, Agent, or Firm*—Reising, Ethington, Barnes, Kisselle, Learman & McCulloch, PC

[57] ABSTRACT

An apparatus and method for controlling an image recording device. The apparatus includes an acousto-optic deflector that deflects a beam of light so as to write a sub-scan comprising a predetermined number of picture elements. The image recording device is arranged to write a plurality of sub-scans side by side in a substantially contiguous manner. The apparatus also includes a component that commences sub-scans, a start of sub-scan detector that detects when the light beam is directed towards a start of sub-scan position, and an end of sub-scan detector that detects when the beam of light is directed towards an end of sub-scan position. A timing logic controller generates a start reference signal representing a desired position for the start of a sub-scan. A controller compares an output of the start of sub-scan detector with respect to the start reference signal. The controller also adjusts a frequency range of a chirp applied to the acousto-optic deflector while keeping a start time of the chirp constant so as to cause an arrival time of the light beam at the start of sub-scan detector to coincide with the start reference signal. A picture element rate controller adjusts a rate at which picture elements are written such that a final one of the picture elements is written a predetermined period before the light beam is directed towards the end of sub-scan position.

12 Claims, 5 Drawing Sheets

APPARATUS FOR AND METHOD OF CONTROLLING AN IMAGE RECORDING DEVICE

BACKGROUND OF THE INVENTION

The present invention relates to an apparatus for and a method of controlling an image recording device, such as a device which scans a modulated light beam over a photosensitive element in order to record an image thereon.

BACKGROUND ART

A flat bed plate setter comprises a flat bed for supporting a photosensitive sheet. The sheets may be flexible aluminium plates which can be exposed and processed to form a printing plate.

The photosensitive sheet is held on the flat bed and an imaging writing head is scanned over the sheet. The imaging writing head is arranged to scan a light beam repeatedly across a short distance, herein referred to a sub-scan, and to be advanced along a first direction between individual sub-scans so as to write a band (which may also be described as a swathe) of the image during a single traverse of the image writing head across the photosensitive sheet. Following completion of each band, the image writing head is advanced along a second direction, which is perpendicular to the first direction, to a position such that the image writing head can write a further band which is substantially contiguous with the most recently completed band.

The width of each band is determined by the length of the sub-scans which form the bands. In order to avoid the joins between adjacent bands becoming visible, it is necessary to accurately control the length of each sub-scan.

An acousto-optic transducer may be employed as a scanning device. Such a solid state device is relatively reliable, but the speed of deflection of the light beam is determined by the properties of the transducer and the optical path travelled by the light beam. The speed of deflection of the light beam cannot be adjusted after manufacture.

Ideally, the scanning device should not give raise to any changes in light intensity as a function of scanning position. However, in practice, the scanning of the light beam may give rise to undesirable fluctuations in the intensity of the light reaching the photosensitive sheet.

SUMMARY OF THE INVENTION

According to a first aspect of the present invention there is provided an apparatus for controlling an image recording device having a light source for producing a beam of light and a scanning device for deflecting the beam of light so as to write a sub-scan comprising a predetermined number of picture elements, the apparatus comprising sub-scan commencing means for commencing a sub-scan, an end of sub-scan detector for detecting when the light beam is directed towards an end of sub-scan position, and a picture element rate controller for adjusting the rate at which the picture elements are written such that a final one of the picture elements is written a predetermined period before the light beam is directed towards the end of sub-scan position.

It is thus possible to ensure that the final picture element of each sub-scan occurs at the same position with respect to the end of scan detector.

Preferably, the predetermined period corresponds to an integer multiple of the time taken to write a picture element.

Preferably the apparatus further comprises a start of sub-scan detector for detecting when the light beam is directed towards a start of sub-scan position. Writing of the picture elements is only commenced after the light beam has been detected by the start of sub-scan detector. It is thus possible to ensure that the start of sub-scan and end of sub-scan positions are well controlled for each sub-scan. Consequently, the width of each band can be well controlled thereby avoiding joins between adjacent bands becoming visible.

Preferably the light source is a laser, and the scanning device is a chirp deflector.

Preferably a timing logic controller generates a start reference signal representing a desired start of sub-scan position. The signal from the start of sub-scan detector is compared with the start reference signal and the operation of the scanning device is adjusted to match the arrival of the light beam at the start of sub-scan detector to coincide with the arrival of the start reference signal. A driving circuit for the scanning device may be controlled by a feedback loop so as to ensure that the time at which the light beam is directed towards the start of sub-scan detector remains in synchronism with the start reference signal generated by the timing logic controller. Advantageously, the start reference signal is generated a fixed period after the scanning device has been instructed to commence a sub-scan.

Preferably the timing logic controller also generates a desired end of sub-scan control signal a predetermined number of clock intervals after the final picture element of each sub-scan has been written. The rate at which the picture elements are written is controlled by a pixel clock. The speed of the pixel clock is adjusted to ensure that the desired end of sub-scan signal coincides with the occurrence of a signal from the end of sub-scan detector indicating that the light beam is impinging on the end of sub-scan detector.

According to a second aspect of the present invention, there is provided a method of controlling an image recording device having a light source for producing a beam of light and a scanning device for deflecting the light beam so as to write a sub-scan comprising a predetermined number of picture elements, the method comprising commencing a sub-scan, detecting when the light beam is directed towards an end of sub-scan position representing the end of a sub-scan, and adjusting the rate at which the picture elements of the sub-scan are written such that a final one of the picture elements is written a predetermined period before the light beam is directed towards the end of sub-scan position.

According to the third aspect of the present invention, there is provided a correction apparatus for correcting the brightness of the picture elements in an image recording device having a light source for producing a beam of light, a modulator for modulating the light, and a scanning device for deflecting the beam of light so as to write a sub-scan comprising a predetermined number of picture elements, the correction apparatus comprising correction means for supplying a corrected modulator drive signal to the modulator such that the intensity of each illuminated picture element is adjusted towards a target brightness for that picture element.

It is thus possible to compensate for variations in the intensity of the light resulting from the operation of the scanning device.

Preferably the correction means comprises a memory, such as a look-up table, which stores a correction factor for each pixel.

Preferably the correction apparatus further comprises a photo-detector for monitoring the intensity of light exiting from the scanning device, and a correction calculator for calculating a corrected modulator drive signal in order to substantially match the output of each illuminated pixel with its respective target brightness.

Advantageously the picture elements are arranged into groups and a correction factor is determined for each group.

The correction apparatus may be arranged to perform a calibration operation in which groups of pixels are illuminated in turn and a correction factor is calculated for each group so as to adjust the illuminated output of each group of pixels towards a target intensity. The target intensity may vary between groups or may be the same for every group. Once a correction factor has been calculated for each group, the calibration operation may be repeated in order to further check that the output of each group of picture elements is within an acceptable intensity range from its target brightness. Further refinements to the correction factor may be calculated if necessary, and the calibration operation may be further repeated until each group is within a specified tolerance of its target brightness, or it is determined that the desired brightness cannot be achieved.

According to a fourth aspect of the present invention, there is provided a method of correcting the brightness of picture elements in an image recording device having a light source for producing a beam of light, a modulator for modulating the light and a scanning device for deflecting the beam of light to write a sub-scan comprising a predetermined number of picture elements, the method comprising supplying a corrected modulator drive signal to the modulator such that the illuminated intensity of each picture element is adjusted towards a target brightness for that picture element.

BRIEF DESCRIPTION OF THE DRAWINGS

The present invention will further be described, by way of example, with reference to the accompanying drawings, in which.

DETAILED DESCRIPTION OF THE INVENTION

Figure 1:
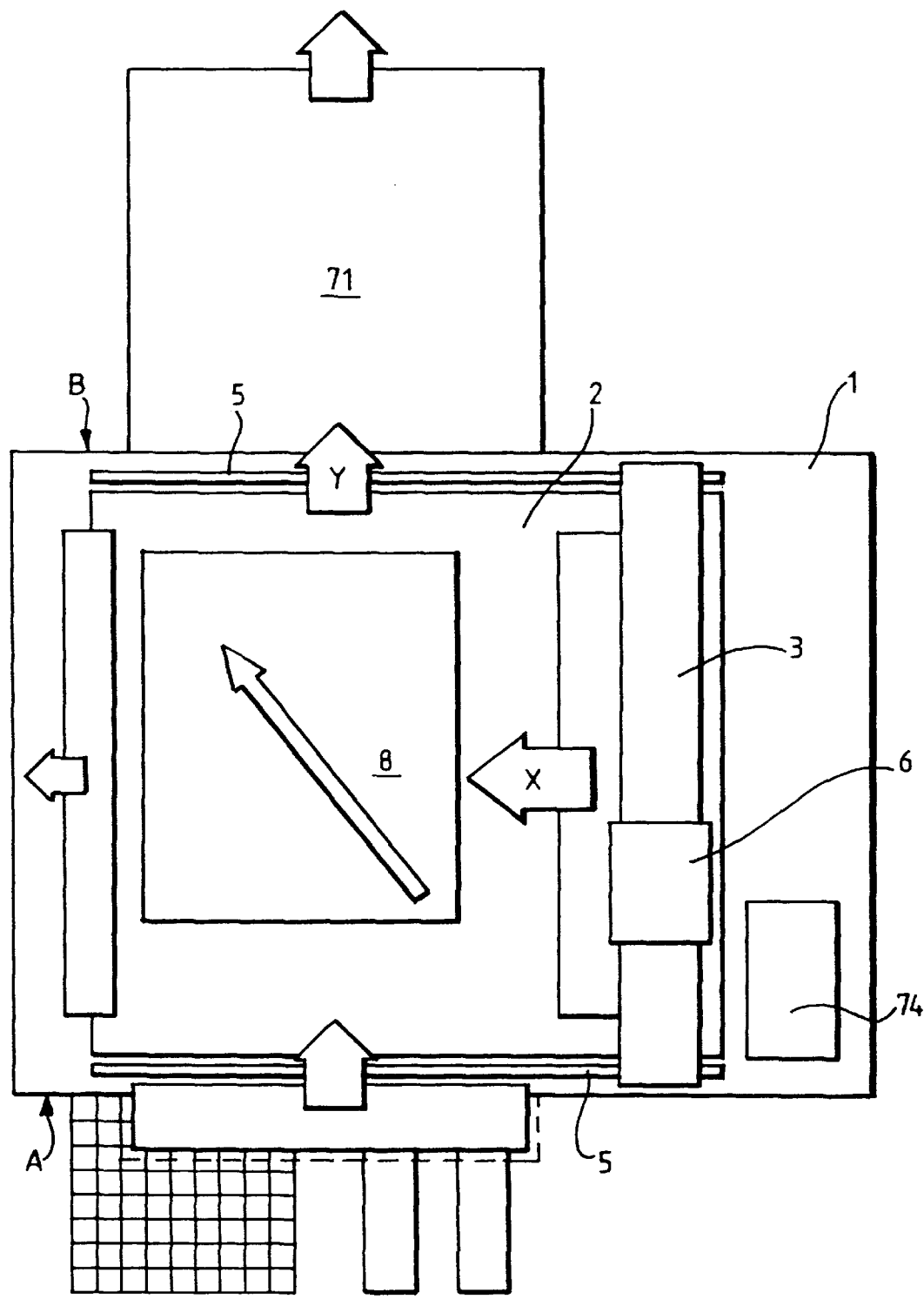
FIG. 1 schematic plan view of a plate setter.

The plate setter illustrated in FIG. 1 consists of a rectangular frame 1 which supports a flat rectangular bed 2. The bed 2 is arranged to support a photosensitive sheet of material to be scanned. A light-beam scanning mechanism is also supported on the top of the frame 1, and consists of a scanning bridge 3 that extends over the bed 2 from a first side A to a second side B. The bridge 3 is supported at each end thereof on carriages for that run along parallel guides 5. The bridge 3 is guided on the parallel guides 5 so as to traverse the bed 2 along the direction of arrow X. A scanning head 6 is mounted on the bridge 3 and is guided along the length of the bridge so as to scan the bed along a line Y parallel to the bed 2 and perpendicular to the direction of the arrow X.

The scanning head 6 incorporates a laser 10 and a scanning device 12 (FIG. 2) which deflects the laser beam along a predetermined short section of the bed 2 parallel to the arrow X. The scanning head 6 is moved along the beam 3, such that the plate setter writes a series of sub-scans which are approximately 5 mm long and formed at intervals of 5 microns. Thus the movement of the scanning head 6 along the Y direction causes a swathe of the photosensitive material to be written. Following completion of a swathe, the bridge 3 is moved along the X direction to a new position such that a second swathe is written adjacent to the first swathe. The width of each swathe is determined by the length of the sub-scans. The length of the sub-scan must therefore be well controlled in order to avoid swathe joins becoming visible in the film or image plate.

Figure 2:
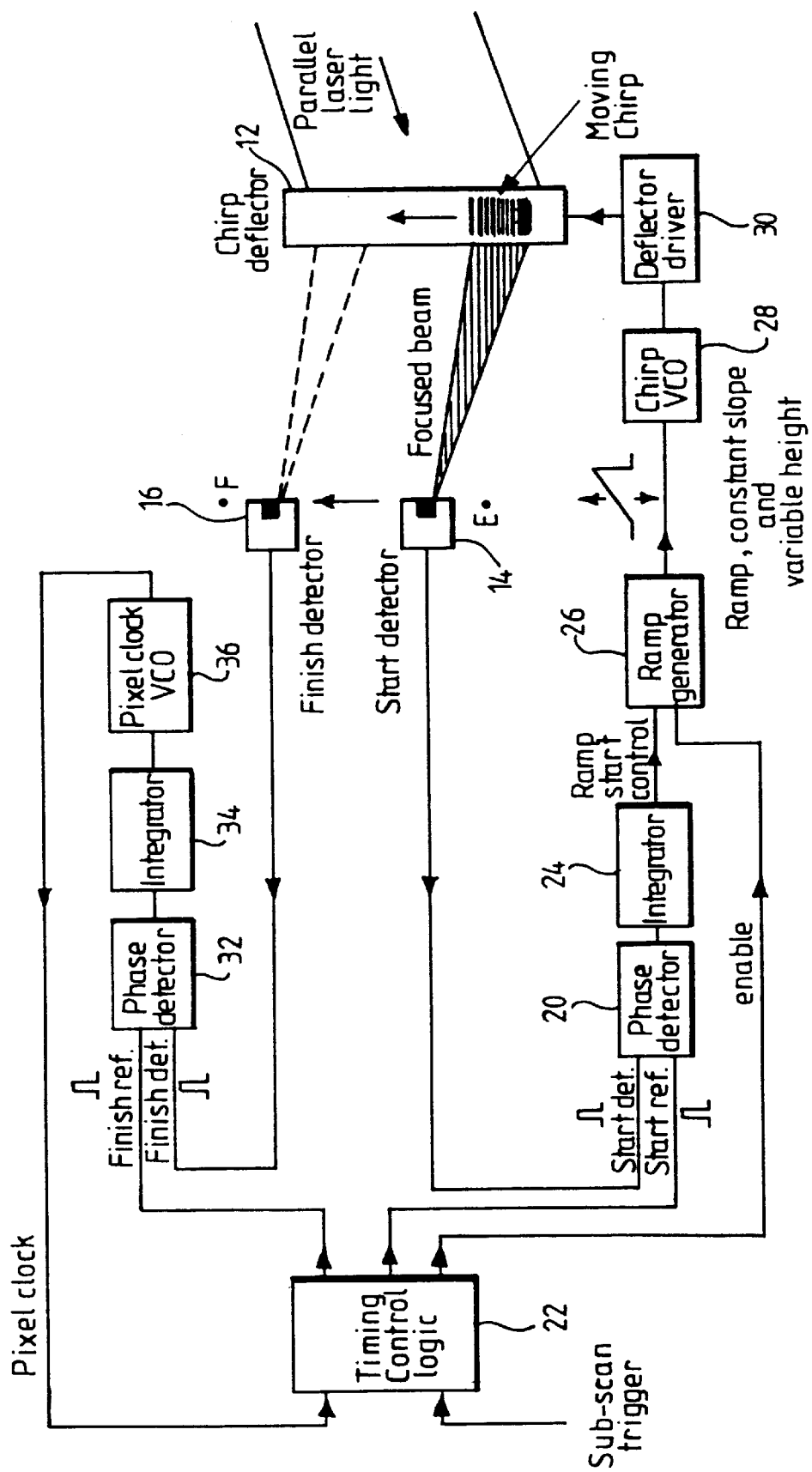
FIG. 2 is a schematic diagram of a control circuit constituting an embodiment of the first aspect of the present invention.

As shown in FIG. 2, light from the laser (not shown) is deflected by an acusto-optic deflector 12. Start and finish photo detectors 14 and 16, respectively, are positioned between the acousto-optic deflector 12 and the bed 2.

An output of the start detector 14 is provided to a first input of a phase detector 20. A second input of the phase detector 20 receives a start reference signal from a timing controller 22. An output of the phase detector 20 is supplied to an input of an integrator 24 whose output is provided to a first input of a ramp generator 26. A second input of the ramp generator 26 receives an enable signal from the timing controller 22. An output of the ramp generator 26 is provided to an input of a voltage controlled oscillator 28, whose output is provided to a driver 30 for driving the acousto-optic deflector 12.

An output of the finish detector 16 is provided to a first input of a second phase detector 32. An second input of the second phase detector 32 receives a finish reference signal from the timing controller 22. An output of the phase detector 32 is provided to an input of a second integrator 34, which in turn provides an output to a second voltage controlled oscillator 36 which acts as a clock controlling the rate at which the picture elements are written. An output of the second voltage controlled oscillator 36 is provided to a "pixel clock" input of the timing controller 22.

Actuation of the deflector 12 causes a laser spot to be deflected between positions E and F indicated in FIG. 2. The position E precedes the start detector 14, whereas the position F occurs after the finish detector 16. Upon receipt of a sub-scan trigger signal, the timing controller 22 asserts an enable signal to the second input of the ramp generator 26. This causes the voltage controlled oscillator 28 and deflector driver 30 to cooperate so as to commence a sub-scan. Simultaneously, the laser (not shown) and any modulator associated therewith are operated to switch the laser spot on. Thus the laser spot is on while the beam scans between position E and the start detector 14. When the laser spot strikes the start detector 14, the detector 14 supplies a start of scan pulse to the first input of the first phase detector 20. The timing controller 22 sends a start reference pulse to the second input of the phase detector 20 a predetermined period after it has asserted the enable signal to the ramp generator 26. The phase detector 20 effectively monitors the arrival times of the pulse from the start detector 14 and the start reference pulse from the timing controller 22, and forms an error signal indicative of the time that has elapsed between the receipt of these two pulses. The error signal is summed by the integrator 24 and is used to control the initial value of the ramp generated by the ramp generator 26. This in turn varies the operation of the deflector 12, thereby changing the duration between the commencement of the scan, and the time at which the light beam impinges on the start detector 14. The phase detector 20, integrator 24 and ramp generator 26 form part of a feedback loop which acts to modify the operation of the deflector 12 such that the light beam impinges on the start detector 14 at the same time as the start reference signal is asserted by the timing controller 22.

The position of the start detector 14 corresponds to a pre-determined number of picture elements prior to the start of the sub-scan. Similarly, the position of the finish detector 16 corresponds to a predetermined number of picture elements following the finish of the sub-scan. The timing controller 22 generates a finish reference pulse a predetermined number of pixel clock intervals (each interval corresponds to the time period required to write a picture element) after the sub-scan has been completed. The second phase detector 32 compares the time of arrival of the finish reference pulse with the time that the laser beam impinges on the finish detector 16 and generates and error signal indicative of the time difference between the arrival of these two pulses. The error signal is integrated by a second integrator 34 and supplied to a voltage controlled oscillator which determines the pixel clock speed and consequently the rate at which the picture elements are written. If the rate at which the picture elements are written is to quick, the finish reference pulse is generated by the timing control logic before the light beam impinges on the finish detector 16 and consequently the phase detector 32 generates a signal which is integrated by the integrator 34 and supplied to the voltage controlled oscillator 36 to slow down the rate at which the picture elements are written. If the picture elements are written to slowly, the signal from the finish detector 16 is received before the finish reference pulse from the timing controller 22. This difference in arrival time is detected by the phase detector 32 which provides a signal to the integrator 34 and hence to the voltage controlled oscillator 36 to increase the rate at which the picture elements are written. Thus a feedback loop is formed which causes the finish reference signal to be generated in synchronism with the receipt of the finish detection signal from the detector 16.

Thus sub-scan start control is achieved by arranging for the control electronics to adjust the deflection angle until the start reference pulse is coincident with the pulse received from the start detector. Similarly, the sub-scan finish control is achieved by adjusting the picture element clock frequency until the finish reference pulse is coincident with the finish pulse from the finish detector.

With both control loops working, it is apparent that the start and finish positions of the sub-scan can be adjusted by straight forward mechanical adjustment of the positions of the start and/or finish detectors.

Figure 3:
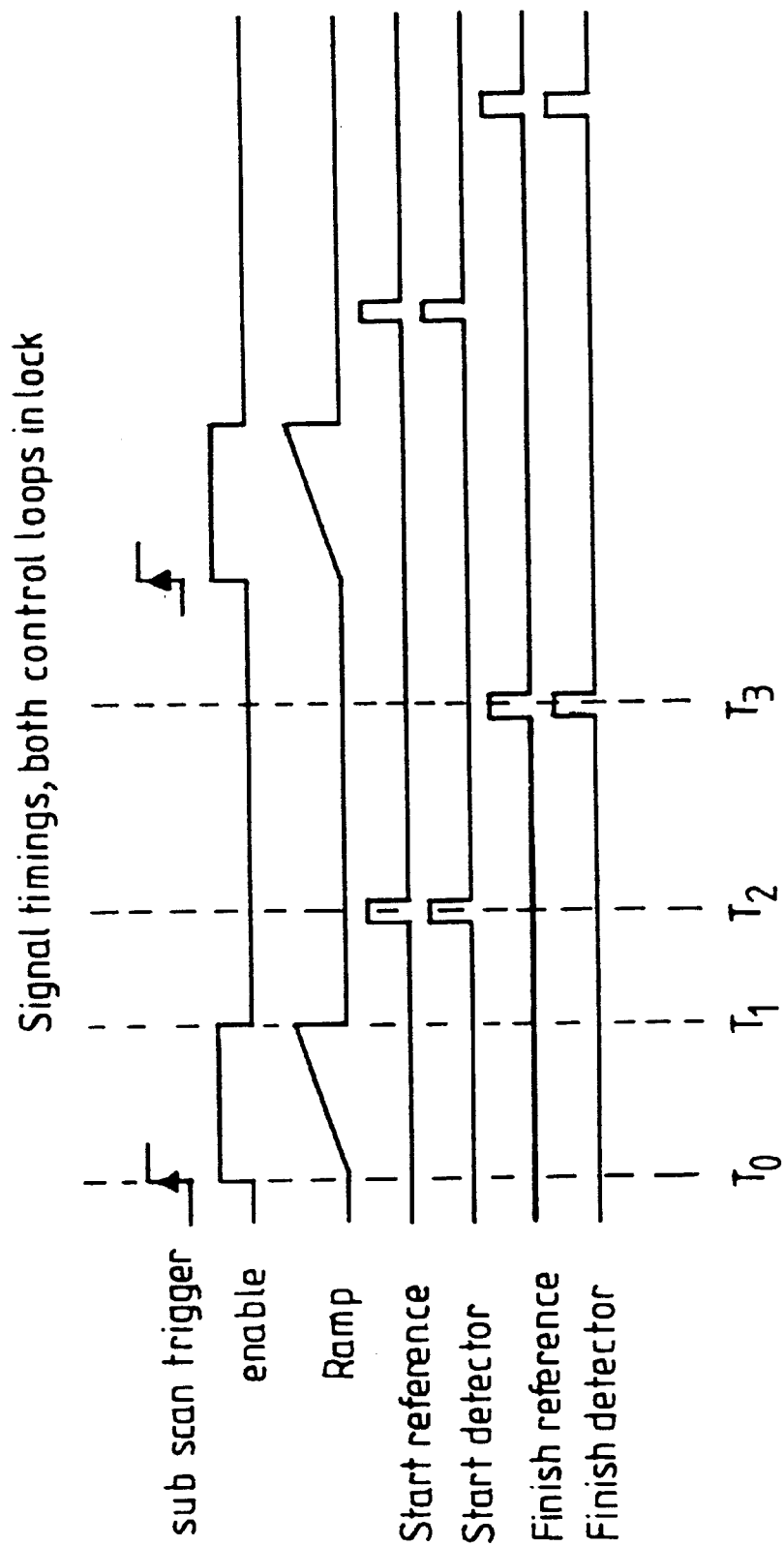
FIG. 3 is a timing diagram illustrating the operation of the circuit shown in FIG. 2.

FIG. 3 illustrates a timing diagram for the arrangement shown in FIG. 2.

At time $T_0$ a sub-scan trigger signal is received by the timing controller from control electronics (not shown). The timing controller supplies an enable signal to the second input of the ramp generator 26 during a period commencing at $T_0$ and finishing at $T_1$. This causes a ramp signal to be supplied to the input of the voltage controlled oscillator 28 between the periods $T_0$ and $T_1$. This in turn causes a chirp to be generated within the deflector 12. The chirp propagates from one side of the deflector to the other and thereby causes the laser spot to be scanned between positions E and F.

The timing controller 22 generates the start reference pulse at $T_2$ which is a predetermined period after time $T_0$. When the control loops are operating properly, a signal from the start detector 14 arrives at the phase detector 20 simultaneously with the receipt of the start reference pulse.

When the laser beam impinges on the finish detector 16 at time $T_3$, the finish detector generates an output pulse. When both control loops are working properly, the timing controller 22 will generate a finish reference signal and coincides with the signal from the finish detector 16. The picture elements are written on to the photosensitive film in a time period bounded by the times $T_2$ and $T_3$. The light spot is controlled to be on when the beam is expected to impinge on either of the start or finish detectors.

Figure 4:
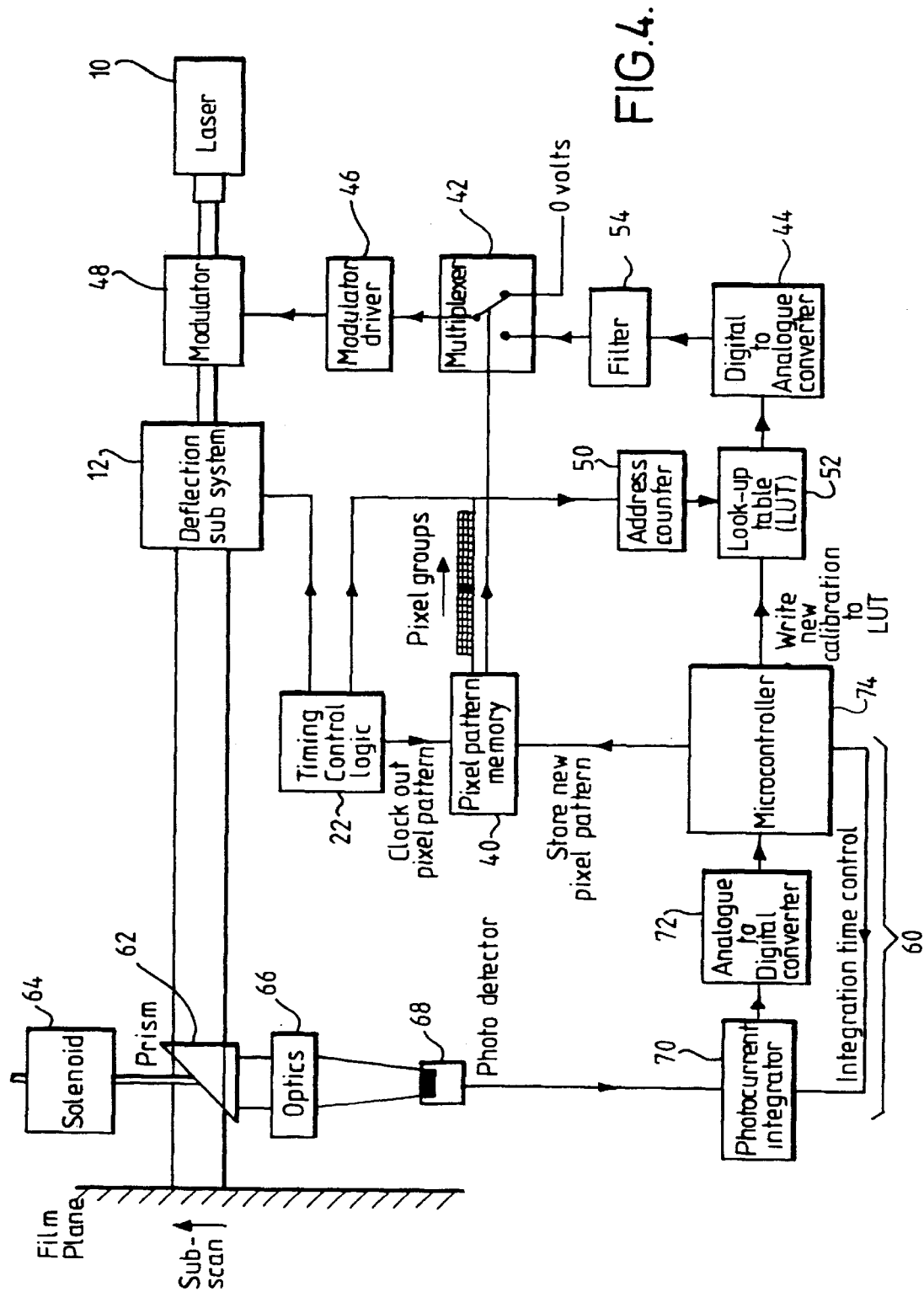
FIG. 4 is a schematic diagram of a correction apparatus constituting an embodiment of the third aspect of the present invention.

The image that is written on to the photosensitive material is a binary image, that is, there are only two exposure levels corresponding to exposed and not exposed. As shown in FIG. 4, the timing controller provides a plurality of clock pulses to a pixel pattern memory 40 which holds information relating to the pixel states for each sub-scan. A serial output of the pixel pattern memory 40 is provided to a control input of a multiplexer 42. A first input of the multiplexer 42 is connected to ground, whereas a second input of the multiplexer 42 received an output from a digital to analogue converter 44. An output of the multiplexer 42 is provided to an input of a modulator driver 46 which in turn controls the transmissivity of a modulator 48 interposed between the laser 10 and the deflector 12.

The timing controller 22 also provides control pulses to an address counter 50 which controls the addressing of a look-up table 52 containing correction values which represent the signal that should be applied to the modulator 48 in order to obtain a laser spot having a target brightness at the photosensitive material. Suppose, for example, that the operation of the deflector 12 is such that the intensity of the laser spot decreases uniformly between the start and end of the sub-scan by 10%. In order to compensate for this, the amount of light transmitted by the modulator 48 to write a bright pixel must increase uniformly such that the modulator transmits 11% more light at the end of the sub-scan compared to the start of the sub-scan. The data in the look-up table 52 is addressed as a function of deflection of the laser spot. The output of the look-up table 52 is provided to an input of a digital to analogue converter 44 which generates a control voltage which is applied to the second input of the multiplexer 42.

Typically, a sub-scan comprises 512 pixels. It is reasonable to assume that the intensity change introduced by the deflector 12 is only a slowly changing function and consequently pixels can be grouped together and, provided the group is small enough, there will be little intensity change between the pixels within an individual group. The arrangement shown in FIG. 4 groups the 512 pixels into 32 groups each containing 16 pixels. The timing controller 22 increments the address counter 50 after every sixteenth pixel of the sub-scan is written so that a new correction value is selected from the look-up table 52 for each individual group of pixels. The image data (i.e. the values of the 512 pixels within a single sub-scan) is supplied in serial form from the pixel memory 40 to the control input of the multiplexer 42. When a bright pixel is to be written, the pixel pattern memory 40 controls the multiplexer to provide the signal at the second input of the multiplexer 42 to the modulator drive 46; whereas when a dark pixel is to be written, the pixel pattern memory controls the multiplexer 42 to provide a zero volt signal to the modulator driver 46. A filter 54 can optionally be interposed between the digital to analogue converter 44 and the multiplexer 42 so as to smooth out the control voltage changes between one pixel group and the next pixel group.

The values in the look-up table 52 may be determined by the manufacturer of the plate setter and stored for all time. Alternatively, a closed loop calibration system may be included within the plate setter as indicated generally by the reference numeral 60. The calibration system comprises a reflector 62 such as a prism or a mirror which is moveable by a solenoid 64 to a calibration position such that it receives the light from the deflector 12. At this position, the light is directed towards an optical system 66 and focused thereby towards a photodetector 68. An output of the photodetector 68 is provided to a signal input of a photocurrent integrator 70. An output of the photocurrent integrator 70 is provided to an input of a digital to analogue converter 72, whose output is provided to a data processor 74. The data processor is arranged to write a test pattern to the pixel memory 40, to modify the correction values stores in the look-up table 52, and to control the operation of the photocurrent integrator 70.

Figure 5:
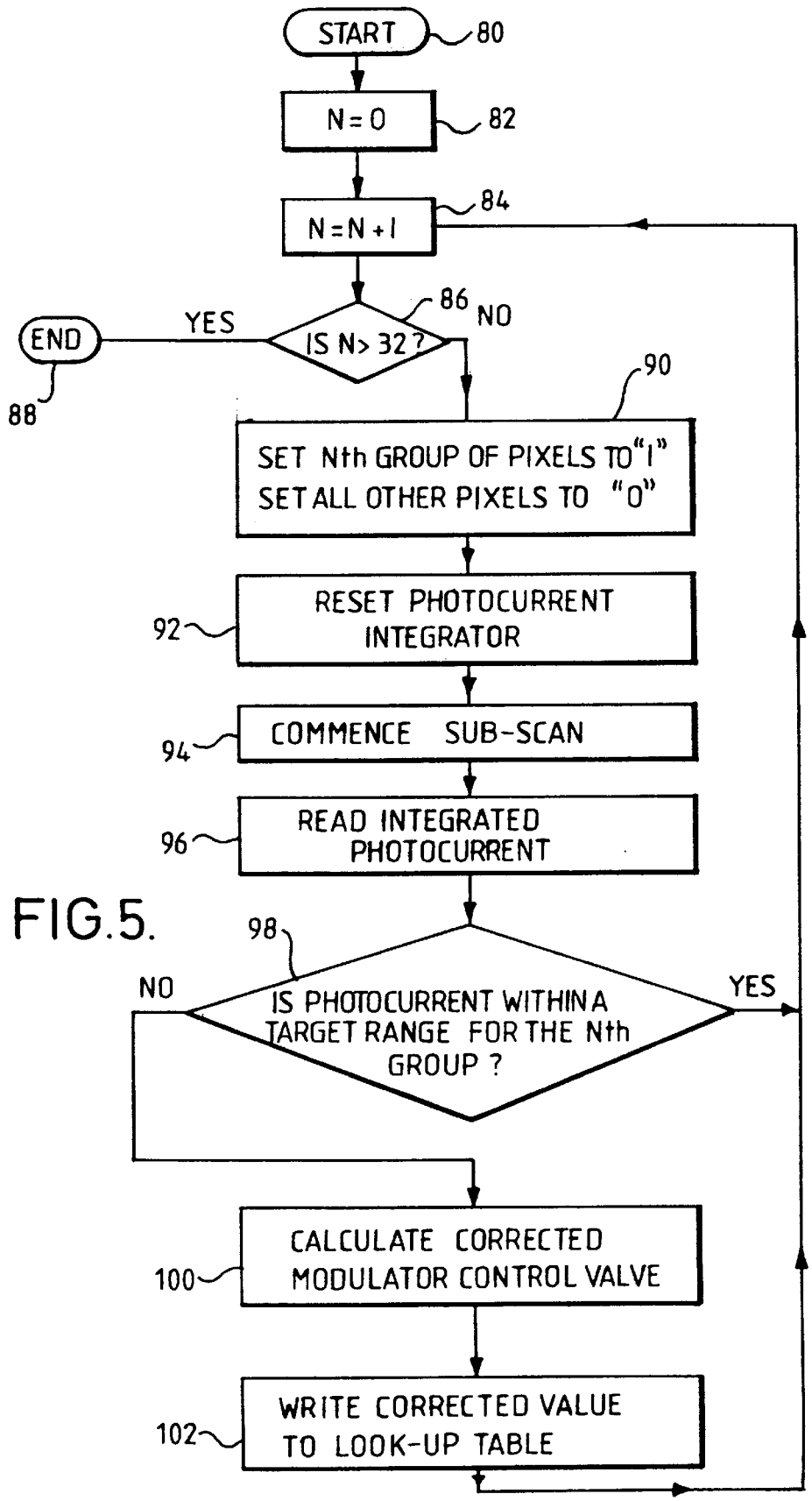
FIG. 5 is flow diagram of the calibration routine.

The operation of the self calibration routine is illustrated in FIG. 5. The solenoid 64 is operated to move reflector 62 to the test position. The self calibration routine is then commenced at step 80. Control is passed to step 82 where a variable N representing the number of the group of pixels that is being written is reset. The variable N is incremented at step 84, and control is the passed to step 86 which performs a test on the value of N. Control is passed to the end of the routine at step 88 if N is greater than 32, otherwise control is passed to step 90. At step 90, the data controller 74 writes a test pattern into the pixel memory 40. The Nth group of pixels are set to a logical "1", whereas all the other pixels are set to a logical "0". The data processor 74 resets the photocurrent integrator 70 at step 92, and then control is passed to step 94 at which the sub-scan is commenced. Following completion the sub-scan, the integrated photocurrent is read at step 96. Step 98 compares the integrated photocurrent with a target range for the Nth group. Control is passed to step 84 if the photocurrent is within the target range, otherwise control is passed to step 100. The difference between the integrated photocurrent and the target range for the Nth group is used to calculate a corrected modulator control value at step 100, and the corrected value is written to the look-up table 52 at step 102. Control is then passed to step 84. The calibration routine may be repeated in order to check that the corrected values achieve the desired intensities.

The calibration procedure may further be arranged to make an initial measurement with all the pixels switched off. This enables a background measurement to be taken to compensate for stray light reaching the photodetector 68 and offsets within the control electronics. This initial value can then be subtracted from all further measurements.

The target brightness may be updated as a function of the photosensitive material which is to be written. This is of benefit as this allows control of both the time required to write an image and the resolution of the image to be controlled.

It is thus possible to control the length of each sub-scan and the relative intensity of the illuminated pixels within each sub-scan, thereby providing an improved final image quality.

What is claimed is:

1. An apparatus for controlling an image recording device having a light source for producing a beam of light and an acousto-optic deflector for deflecting the beam of light so as to write a sub-scan comprising a predetermined number of picture elements, the image recording device being arranged to write a plurality of sub-scans side by side in a substantially contiguous manner, said apparatus comprising sub-scan commencing means for commencing a sub-scan, a start of sub-scan detector for detecting when the light beam is directed towards a start of sub-scan position, an end of sub-scan detector for detecting when the beam of light is directed towards an end of sub-scan position, a timing logic controller for generating a start reference signal representing a desired position for the start of a sub-scan, and a control arrangement for comparing an output of the start of sub-scan detector with respect to the start reference signal and for adjusting a frequency range of a chirp applied to said acousto-optic deflector while keeping a start time of the chirp constant so as to cause an arrival time of the light beam at the start of sub-scan detector to coincide with the start reference signal, and picture element rate controller for adjusting a rate at which picture elements are written such that a final one of the picture elements is written a predetermined period before the light beam is directed towards the end of sub-scan position.

2. An apparatus as claimed in claim 1, in which the predetermined period corresponds to an integer multiple of a time period taken to write a picture element.

3. An apparatus as claimed in claim 1, in which writing of the picture elements is only commenced after the light beam has been detected by said start of sub-scan detector.

4. An apparatus as claimed in claim 1, in which the control arrangement is a driving circuit for the acousto-optic deflector, and in which the driving circuit is controlled by a feedback loop so as to ensure that the time at which the light beam is directed towards the start of sub-scan detector remains in synchronism with the start reference signal generated by the timing logic controller.

5. An apparatus as claimed in claim 1, in which the timing logic controller also generates a finish reference signal representing a desired end of sub-scan position a predetermined number of clock intervals after the final picture element of each sub-scan has been written.

6. An apparatus as claimed in claim 5, in which the rate at which the picture elements are written is adjusted to ensure that the finish reference signal coincides with the occurrence of a signal from the end of sub-scan detector indicating that the light beam is impinging of the end of sub-scan detector.

7. An apparatus as claimed claim 1, in which the light source is a laser.

8. An apparatus as claimed in claim 1, further comprising a modulator for modulating light and a correction apparatus for correcting the brightness of the picture elements, the correction apparatus comprising a correcting means for supplying a corrected modulator drive signal to the modulator such that the intensity of each illuminated picture element is adjusted towards a target brightness for that picture element.

9. An apparatus as claimed in claim 8, in which the correction means comprises a memory which stores a correction factor for each pixel.

10. An apparatus as claimed in claim 8, further comprising a photo-detector for monitoring the intensity of light exiting from the scanning device and a correction calculator for calculating a corrected modulator drive signal in order to substantially match the output of each illuminated pixel with its respective target brightness.

11. An apparatus as claimed in any one of claim 8, in which the picture elements are arranged in groups and a correction factor is determined for each group.

12. A method of controlling an image recording device having a light source for producing a beam of light and an acousto-optic deflector for deflecting the light beam so as to write a sub-scan comprising a predetermined number of picture elements, the image recording device being arranged to write a plurality of sub-scans side by side in a substantially contiguous manner, the method comprising commencing a sub-scan, generating a start of scan reference pulse, detecting when the deflected beam arrives at a start of sub-scan detector, comparing arrival times of the beam at the start of scan deflector and the start of scan reference pulse and varying a frequency range of a chirp applied to the acousto-optic deflector while keeping a start time of the chirp constant in order to cause the arrival of the light beam at the start of sub-scan detector to be coincident with the start of scan reference pulse, detecting when the light beam is directed towards an end of sub-scan position, and adjusting a rate at which the picture elements of the sub-scan are written such that a final one of the picture elements of the sub-scan are written a predetermined period before the light beam is directed towards the end of sub-scan position.

* * * * *